(No Model.)

2 Sheets—Sheet 1.

G. F. S. ZIMMERMAN.
CORN HARVESTER.

No. 427,531.

Patented May 6, 1890.

WITNESSES
F. L. Ouraud
A. L. Morsell

INVENTOR
Geo. F. S. Zimmerman,
By Acker and Morsell
His Attorneys.

(No Model.)
G. F. S. ZIMMERMAN.
CORN HARVESTER.
No. 427,531. Patented May 6, 1890.
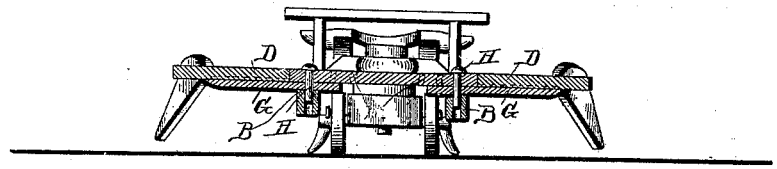
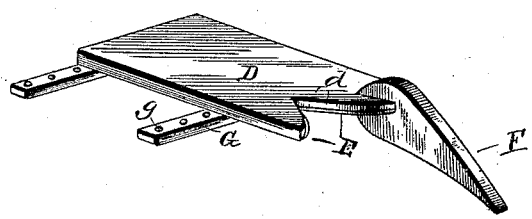
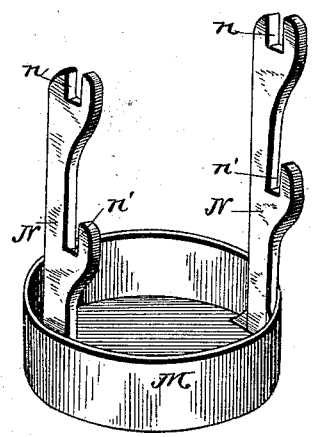
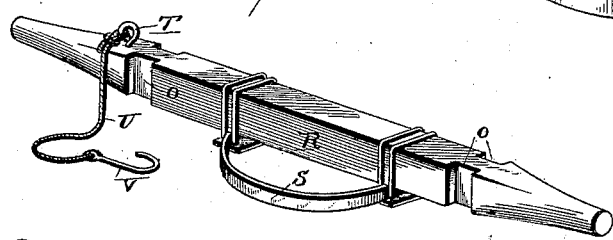
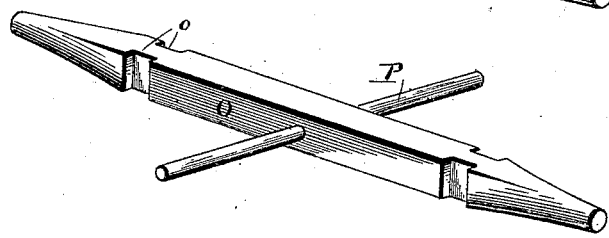
WITNESSES
F. L. Ourand
A. L. Morsell
INVENTOR
Geo. F. S. Zimmerman
By
Acker and Morsell
His Attorneys.

UNITED STATES PATENT OFFICE.

GEORGE F. S. ZIMMERMAN, OF FREDERICK, MARYLAND, ASSIGNOR OF ONE-HALF TO WILLIAM H. BLENTLINGER, OF SAME PLACE.

CORN-HARVESTER.

SPECIFICATION forming part of Letters Patent No. 427,531, dated May 6, 1890.

Application filed July 13, 1889. Serial No. 317,417. (No model.)

*To all whom it may concern:*

Be it known that I, GEORGE F. S. ZIMMERMAN, a citizen of the United States, residing at Frederick, in the county of Frederick and State of Maryland, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to certain new and useful improvements in corn-harvesters; and it consists in providing a device for this purpose capable of cutting two rows at a time, and which shall not only effectually cut the corn in the field, but also provide means for conveniently collecting the stalks into shocks, when they may be tied and then deposited butt down upon the ground; and with these ends in view it consists of the improved construction and arrangement of parts, as hereinafter fully set forth.

Figure 1:
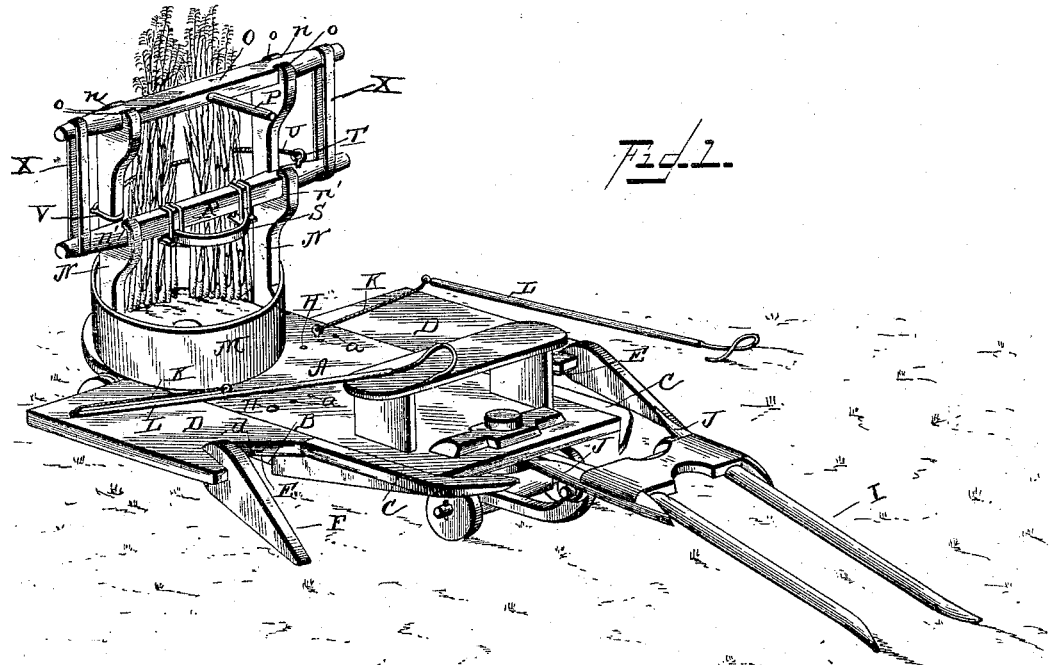
Figure 2:
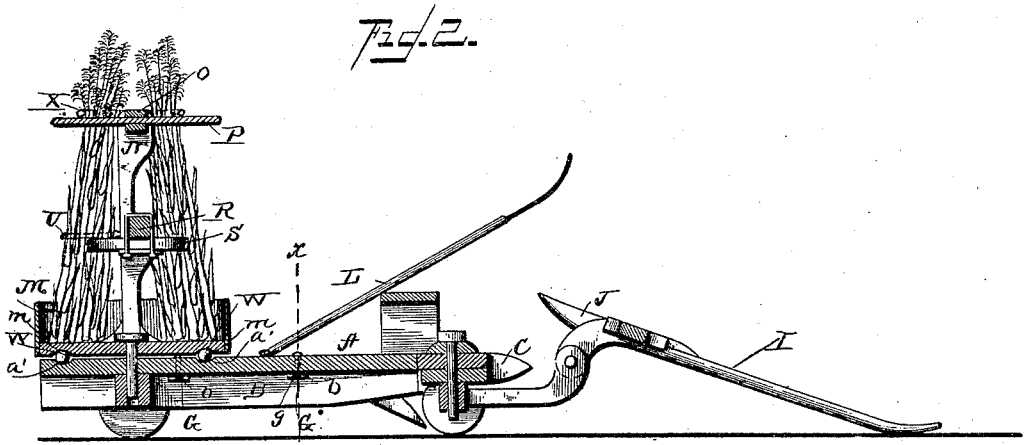

Referring to the drawings, forming a part of this specification, Figure 1 is a perspective view of my improved corn-harvester complete, showing the stalks arranged into a shock within the revoluble stalk-receptacle, and showing the band connecting the ends of the cross-pieces. Fig. 2 is a longitudinal vertical sectional view. Fig. 3 is a cross-sectional view taken on line $x\, x$, Fig. 2. Fig. 4 is a detail view in perspective of the knife-frame. Fig. 5 is a detail view in perspective of the revoluble platform or stalk-receptacle and the notched uprights or standards thereof, and Figs. 6 and 7 are detail views of the upper and lower cross-bars.

Similar letters denote corresponding parts throughout the entire specification and several views of the drawings.

In the accompanying drawings, the letter A represents the frame or body of my improved harvester mounted upon suitable drive-wheels and provided with depending side pieces B B, said pieces being provided with rectangular holes or apertures $b\, b$. The base or platform of the frame is formed or provided on its side edges, toward the front portion thereof, with strips C C, said strips extending out beyond the front of the frame and then bent inwardly.

The letters D D represent rectangular knife-frames, said frames being provided on their front edges with V-shaped notches $d\, d$, and upon their under sides are secured cutting-blades E E, said blades being provided with straight edges and meeting at their inner ends, so as, also, to present a V-shaped form, the cutting-edges thereof extending out beyond the edges of the notches. The cutting-frames are also provided upon their front portions, toward their outer side edges, with downwardly and obliquely extending gatherers F F, which, in connection with the strips C C as the machine passes over the ground, have a tendency to gather the growing corn and converge a quantity thereof into the V-shaped slot of the cutting-frame, there to be severed by the cutting-blades.

If desired, the cutting-frames may be made simply as lateral extensions of the platform of the frame; but I prefer to make the same removable as well as adjustable, and I attain these objects by providing inwardly-extending arms G G, which pass through the rectangular notches or apertures in the side pieces B B and beneath said platform. These inwardly-extending arms are provided with a series of perforations $g\, g$, which register with a similar series of perforations $a\, a$ in the platform of the frame and extending transversely for a suitable distance above each of the inwardly-extending arms. In the first place, by making the cutting-frames removable, in case of damage thereto they can be readily withdrawn and repaired or replaced by others, if found necessary; but should they be formed in one piece with the body of the machine any damage thereto would practically render the entire frame or floor of the device worthless. In the second place, by employing means for giving adjustability to the cutting-frames, I am enabled to accommodate different widths of corn-rows, as it is obvious that when a corn-row of increased width is encountered all that is necessary to be done is simply to draw the frames out laterally until the desired width is obtained, when the same may be secured in their adjusted position by means of pins or bolts H H, passing through the registering perforations.

The letter I represents the shaft of the machine, which is formed or provided with rearwardly-extending guards J J, designed to prevent the cornstalks from passing in front of the machine or to the rear of the shafts, and thereby impeding its progress. By providing these guards, however, in connection with the inwardly-extending portions of the strips C C, the space between the shafts and the front of the machine is closed, and as both these guards and said inwardly-extending portions of the strips are beveled downwardly it has a tendency to throw the corn into the contracted V-shaped slots of the cutting-frame, in order to encounter the cutting-blades. I also secure to each side of the frame A, by means of cords or equivalents K K, hooks L L, adapted to be operated by persons standing on the machine, and thus assist in gathering the corn to the knives. The employment of these hooks in some cases is rendered absolutely necessary, inasmuch, as is well known, frequently the cornstalks become bent or are too far from the machine to be reached by the gatherers F F, even though the cutting-frames be adjusted to their extreme outward limit. In this case the operator simply engages the stalks with the hooks, and draws the same toward the machine until they are brought within the V-shaped slot.

Turning in a pivot in the rear of the machine is a revoluble stalk-receptacle M, consisting of an annular open-top chamber. Extending upward from diametrically-opposite points of this annular receptacle are standards or uprights N N, provided with top and central notches n n n' n'. A cross-bar O fits in the upper notches of the standards, and in order to effect a close joint is provided upon opposite sides of its ends with registering notches o o. The upper cross-bar is intersected by a loose pin P. A central cross-bar R fits in the central notches of the standards or uprights, and is provided upon its under side with a ring or hoop S. This central cross-bar has also secured to one end thereof a screw-eye or equivalent T, to which is secured one end of the cord U, the free end of said cord having attached thereto a hook V.

This being the construction of my improved device, the operation thereof is as follows: The machine traverses the ground between two rows of corn, the cutting-frame in the first place having been suitably adjusted. Two persons stand upon the platform of the frame on opposite sides, and by means of the hooks L L assist in gathering the cornstalks into the contracted or V-shaped slot. As the stalks are cut, the operators place the same within the stalk-receptacle, the butts thereof resting against the annular rim of said receptacle, while the ends are brought together or converged at their top. It will be seen that the circular plate S has the effect of spreading apart the butts of the stalks and to keep them pressed closely against the annular rim, while the pin intersecting the upper cross-bar forms two angles at each side of said bar, which are filled separately—that is to say, one angle is first filled completely, usually accommodating thirty to fifty stalks, and then the next angle is likewise filled. The receptacle is then turned by the operator and the other portion thereof filled in a similar manner. In order to prevent friction in turning the revoluble stalk-receptacle, I provide the under side of the same with an annular recess or groove m, near its outer periphery, registering with a similar groove or recess a' in the rear portion of the platform of the machine and having located therein ball-bearings W. To guard against the stalks falling out, however, when one side of the receptacle is filled and the same is revolved toward the rear, I provide the cord or equivalent U and hook V, previously explained, said cord being passed around the stalks and the hooks secured to one of the standards. After the receptacle has been filled I securely tie the upper ends of the stalks and also pass bands X X around the ends of the two cross-pieces and then unhook the cord U. After this the shock can readily be lifted from the receptacle without danger of coming apart, the circular hoop or ring S, as stated, keeping the butt ends diverged or spread apart. After depositing the shock upon the ground the bands X X are removed from the cross-pieces, and the central cross-piece first tilted edgewise and permitted to fall to the ground, and is then withdrawn, after which the loose pin is withdrawn, so that the top cross-bar can readily fall and be drawn out from under the shock, leaving the same standing complete and securely bound.

From the foregoing description, taken in connection with the accompanying drawings, the advantages of my improvement will be readily understood. It will be noticed that my device performs the cutting in a most effectual manner, and at the same time the cutting-frame may be readily removed in case of damage thereto. Further, the adjustability of the cutting-frame adapts my device to different widths of corn-rows. Furthermore, by providing the revoluble stalk-receptacle in connection with the frame of my machine I am enabled to arrange the stalks as cut into a shock, and provide for their convenient removal from the machine.

I am aware that many minor changes may be made in the construction and arrangement of parts herein described without departing from the nature and scope of my invention.

Having thus described my invention, I claim and desire to secure by Letters Patent of the United States—

1. In a corn-harvester, the combination of a frame formed or provided with side strips, said strips extending out beyond the sides of the frame and then bent inwardly, forming inner guides and also guards for preventing the corn from passing between the frame and the thills, thills suitably secured to the fore axle of the frame, laterally-extending flat cutter-frames provided with V-shaped notches or slots in their front edges, downwardly and obliquely extending gatherers, and V-shaped cutting-blades, substantially as set forth.

2. In a corn-harvester, the combination of a frame formed or provided with side strips, said strips extending out beyond the front portion of the frame and then bent inwardly and beveled downwardly, cutter-frames provided with V-shaped notches or slots in their front edges, V-shaped cutting-blades, and a shaft formed or provided with rearwardly-extending guards, said guards being beveled downwardly, substantially as set forth.

3. In a corn-harvester, the combination, with the frame thereof, of a revoluble stalk-receptacle, notched standards or uprights extending therefrom, and cross-bars fitting in said notches, substantially as set forth.

4. In a corn-harvester, the combination, with the frame thereof, of a revoluble stalk-receptacle, notched standards or uprights extending therefrom, cross-bars fitting in said notches, and a cord or equivalent secured to the lower cross-bar and provided on its end with a hook, substantially as set forth.

5. In a corn-harvester, the combination, with the frame thereof, of a revoluble stalk-receptacle, notched standards or uprights extending therefrom, cross-bars fitting in said notches, and a ring or hoop secured to the lower cross-bar, substantially as set forth.

6. In a corn-harvester, the combination, with the frame thereof, of a revoluble stalk-receptacle, notched standards or uprights extending therefrom, cross-bars fitting in said notches, and a loose pin intersecting the upper bar, substantially as set forth.

7. In a corn-harvester, the combination, with the frame thereof, of a revoluble stalk-receptacle, notched standards extending therefrom, cross-bars fitting in said standards, a hoop or ring beneath the lower cross-bar, and a loose pin intersecting the upper cross-bar, substantially as set forth.

8. In a corn-harvester, the combination, with the frame thereof, of a revoluble stalk-receptacle, notched standards or uprights extending therefrom, cross-bars fitting in said notches, and bands for securing the ends of the cross-bars, substantially as set forth.

9. In a corn-harvester, the combination, with the frame thereof, of hooks secured to said frame by means of cords or equivalents, substantially as set forth.

In testimony whereof I affix my signature in presence of two witnesses.

GEORGE F. S. ZIMMERMAN.

Witnesses:
 EDWIN C. MARKELL,
 MARSHALL FOUT.